United States Patent [19]
Brass et al.

[11] Patent Number: 5,397,158
[45] Date of Patent: Mar. 14, 1995

[54] WALLBOARD CARRIER FOR READILY LIFTING AND CARRYING WALLBOARD AND THE LIKE

[76] Inventors: Robert L. Brass, 242 Lake Plymouth Blvd., Plymouth, Conn. 06782; James M. Ferro, 34 North St., Huntington, Conn. 06484

[21] Appl. No.: 77,122

[22] Filed: Jun. 14, 1993

[51] Int. Cl.⁶ .................. B65G 7/12; B66F 11/00
[52] U.S. Cl. ............................ 294/15; 294/26
[58] Field of Search .......... 294/15, 17, 19.1, 26, 294/27.1, 32, 137; 254/131

[56] References Cited

U.S. PATENT DOCUMENTS

| | | | |
|---|---|---|---|
| 119,213 | 9/1871 | Yardley | 294/26 |
| D. 255,317 | 6/1980 | Slinkard | 294/15 X |
| 576,358 | 2/1897 | Antes | 294/26 X |
| 1,082,446 | 12/1913 | Rodman | 294/26 |
| 2,428,941 | 10/1947 | Packard | 294/26 X |
| 3,940,171 | 2/1976 | Carlsson | 294/15 X |
| 4,177,911 | 12/1979 | Griffin | 294/15 X |
| 4,463,977 | 8/1984 | Wyatt | 294/26 |
| 4,630,838 | 12/1986 | Stockton | 294/15 X |
| 5,257,843 | 11/1993 | Nunn | 294/15 |

FOREIGN PATENT DOCUMENTS

| | | | |
|---|---|---|---|
| 1064438 | 10/1979 | Canada | 294/15 |
| 2155319 | 9/1985 | United Kingdom | 294/15 |
| 2171352 | 8/1986 | United Kingdom | 294/26 |

*Primary Examiner*—Johnny D. Cherry
*Attorney, Agent, or Firm*—Haynes N. Johnson

[57] ABSTRACT

A wallboard carrier with a supporting platform to hold the wallboard and a pair of shanks extending upwardly from said platform and leading to a horizontal handle. A lip on the outer edge of the platform, opposite the shanks, holds the wallboard on the platform between the lip and the shanks. Ridges or grooves running across the platform prevent the board from slipping horizontally along its longitudinal edge. The bottom of the platform is rounded, so the lip may be placed underneath the edge of a piece of horizontal wallboard and the board rolled onto the platform and into a vertical position for carrying.

4 Claims, 2 Drawing Sheets

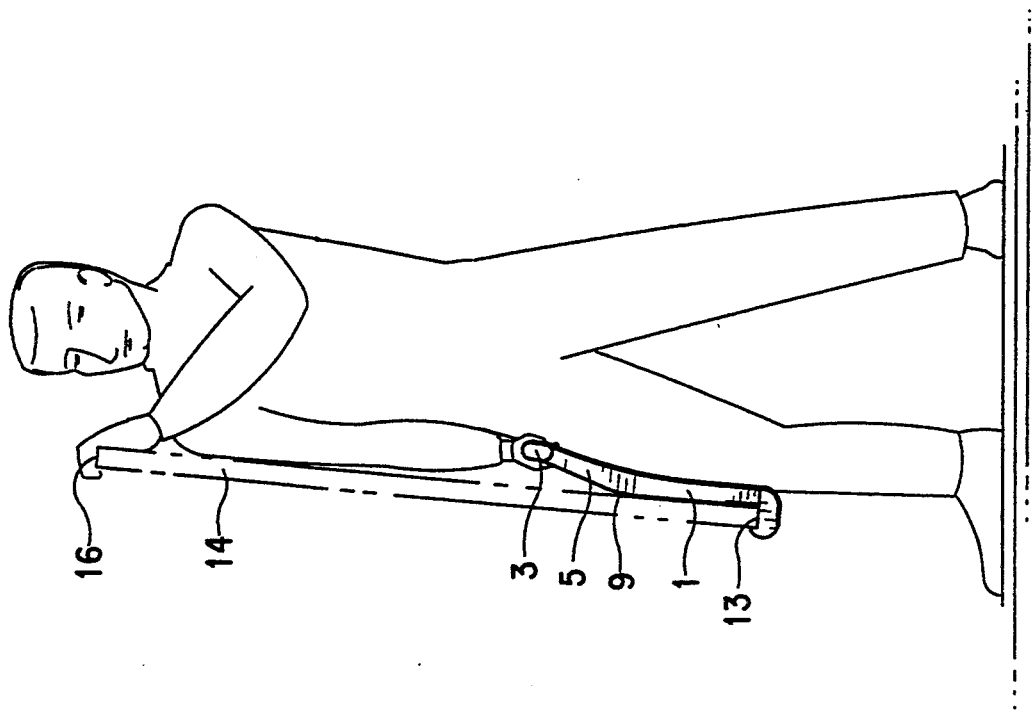
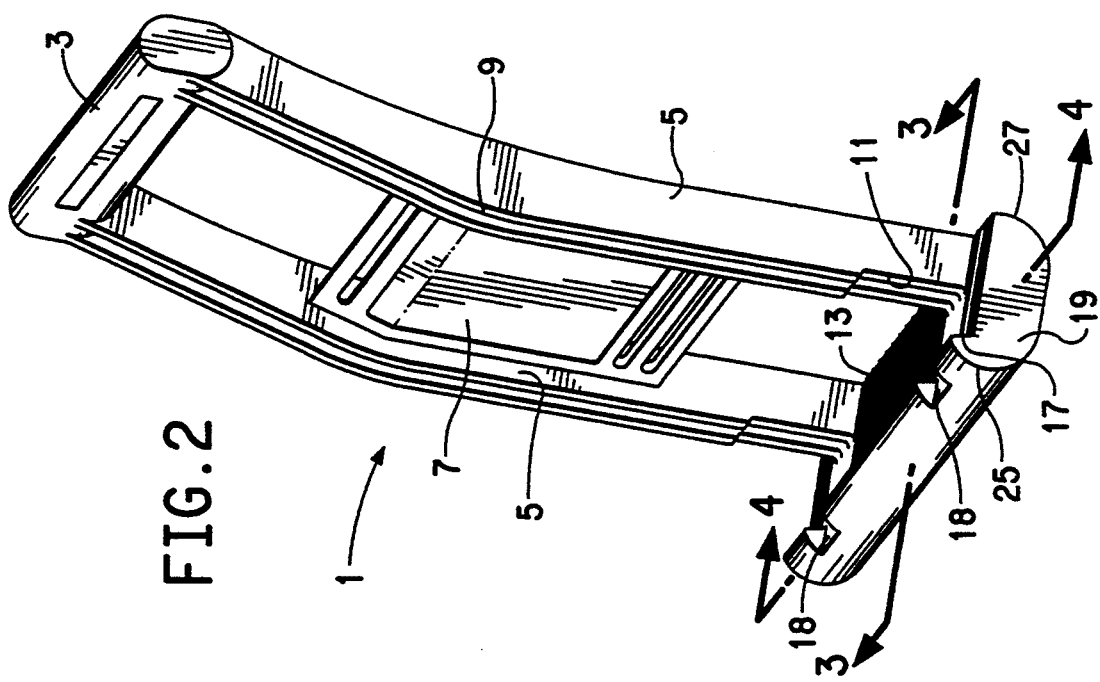

WALLBOARD CARRIER FOR READILY LIFTING AND CARRYING WALLBOARD AND THE LIKE

FILED OF THE INVENTION

This invention relates to the field of tools, and, in particular, to tools serving as a carrier for wallboard, plywood, Masonite, and the like.

BACKGROUND OF THE INVENTION

Workmen on construction jobs must, of necessity, carry considerable amounts of wallboard and plywood. The usual four by eight foot sheets are heavy and clumsy to carry. Ordinarily, one grasps one of the two eight-foot edges in one hand and the opposite edge in the other hand. This is cumbersome and means that the board will extend above the workman's head and often make it difficult for him to pass through doorways.

One partial solution to these problems is found in Russo U.S. Pat. No. 4,013,202. This, however, is a somewhat complicated and more expensive design and could result in the workman dropping the wallboard.

BRIEF SUMMARY OF THE INVENTION

Our wallboard carrier allows wallboard to be carried at a lower height without the necessity of the workman having to stoop. In effect, it acts as an arm extender so that the lower edge of the wallboard is held closer to the floor, and the upper edge is not above one's head. The upper edge of the wallboard is balanced by the workmen's opposite hand.

The carrier includes a supporting platform to hold the wallboard and a pair of upwardly extending shanks leading to a horizontal handle.

A lip on the outer edge of the platform prevents the board from slipping off. The bottom of the platform is rounded, so the lip may be placed underneath the edge of a piece of horizontal wallboard and the board rolled onto the platform and into a vertical position for carrying. Ridges or grooves running across the platform prevent the board from slipping horizontally along its longitudinal edge.

DESCRIPTION OF THE DRAWINGS

FIG. 1 is a view of a workman carrying a piece of wallboard using the carrier of my invention.

FIG. 2 is a perspective view of the carrier.

DETAILED DESCRIPTION OF THE INVENTION

Figure 3:
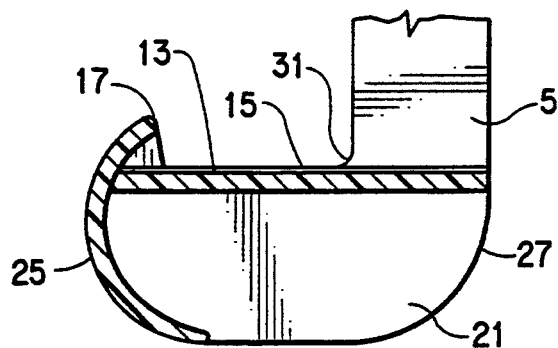
FIG. 3 is a vertical section taken on line 3—3 of FIG. 2.

FIG. 1 shows my carrier 1 in use with a workman carrying a piece of wallboard 14. (By "wallboard" I refer to sheets of plasterboard, plywood, Masonite, and the like, usually measuring four by eight feet). The man's right hand holds the handle 3; the board 14 is resting on platform (base) 13; and the man's left hand is positioned on the top edge 16 of the board to balance it. The vertical dimension of the board is the shorter side, i.e., the four foot width.

The carrier itself is best seen in FIG. 2. It is preferably molded as an integral unit, using a suitable plastic. It has a horizontal handle 3 connected to the upper ends of two substantially vertical parallel platform-supporting shanks 5. A horizontal platform 13 is formed integrally with the lower ends of shanks 5, to one side of them (the "outer side" of the shanks). The platform is usually of a width of about one and one-eighth inch, such that it can hold two pieces of wallboard at one time. A reinforcing spacer 7 is between the shanks, connecting them.

The shanks 5 have a bend 9 at approximately their midpoint. This bend is away from the outer side of the shanks and inwardly towards the workmen's body (FIG. 1), and provides space for the man to hold the handle without his hand being pressed against the wallboard. Rather, the angle of the bend is preferably such that the man's hand will just touch it, allowing him to use that hand to assist in balancing the board. For strength combined with lightness, the shanks have an H-beam cross-section.

Figure 4:
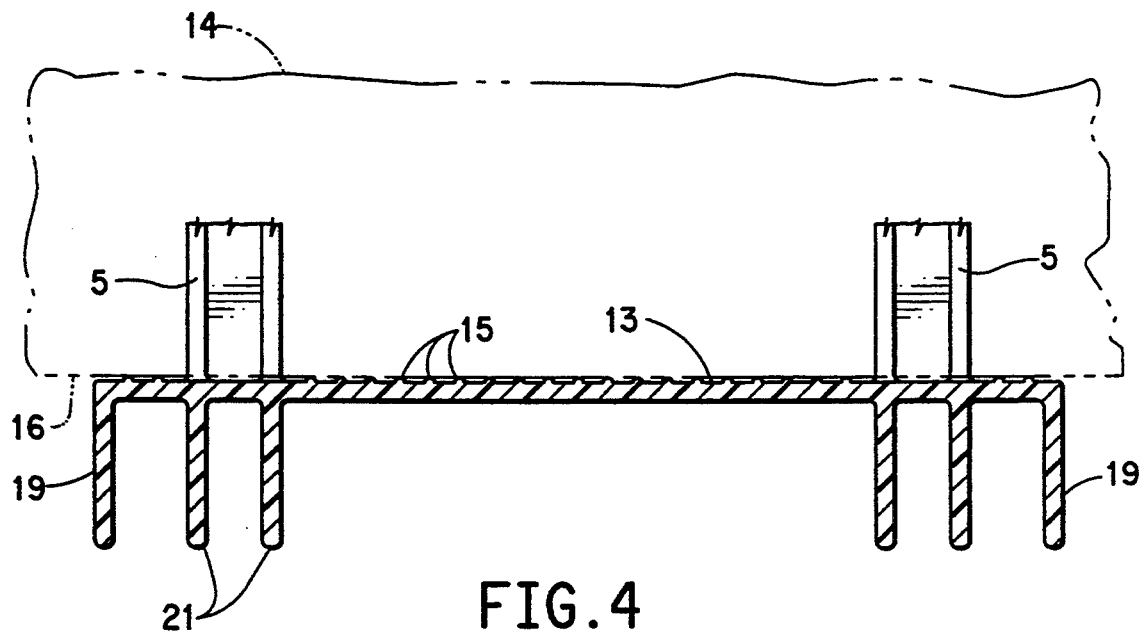
FIG. 4 is a vertical section taken on line 4—4 of FIG. 2. A piece of wallboard is shown in phantom.

The outer edge of the platform (i.e., the edge on the side of the platform facing away from the man) is formed into an upwardly extending lip 17 to hold the wallboard on the platform. The outer edge of the lip has a front curve 25, and the rear edge of the platform has a rear curve 27. These curves have horizontal axes running longitudinally of the platform. The platform has end pieces 19 and inner support members 21 (FIG. 4). The lip 17 may also include slots 18 opposite the two shanks 5, for mold access during manufacture.

The upper surface of platform 13 carries a series of transverse ribs 15 (FIG. 4) to prevent wallboard from sliding longitudinally on the platform. The ribs have a total top surface area (horizontal area) that is sufficient to grip the wallboard, but the surface area is not so small that the ribs will press into the wallboard and form permanent dents.

The outer sides of the shanks 5, adjacent to the platform 13, have recesses 11 about one-sixteenth inch deep. This permits the joint where the shanks 5 and the platform 13 come together to be slightly curved as at 31, without touching the wallboard, adding strength to the structure at that joint.

To use the carrier, the workman takes one or more sheets of wallboard 14 and places the center of one of its long edges 16 on platform 13, with the wallboard being vertical.. He then takes the handle 3 in one hand, grasps the upper edge of the wallboard with his other hand, and lifts the carrier 1, thus lifting the wallboard. Since the carrier allows the lower edge 16 to be closer to the floor, the upper edge will not come much, if any, above the man's head; and the wallboard can be easily carried through doorways.

Figure 5:
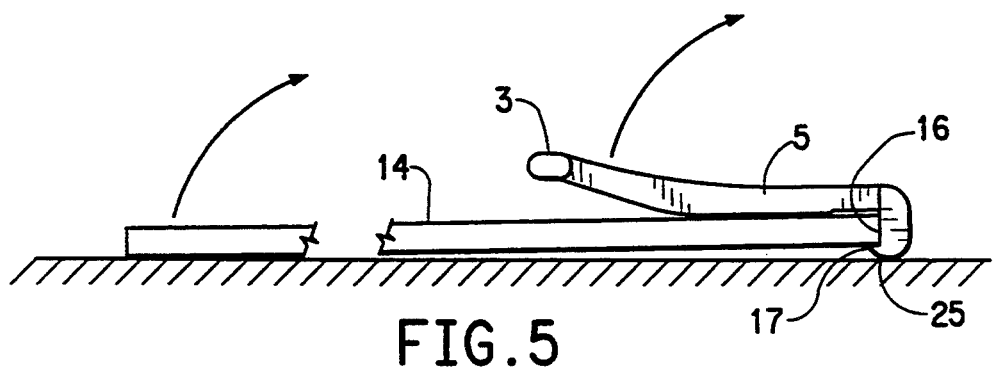
FIG. 5 is a side elevation showing how the carrier can be used to lift a piece of wallboard that has been resting on a horizontal surface.

Another method of getting the board on the carrier is shown in FIG. 5. Starting with a piece of horizontal wallboard, forward lip 17 of the carrier is inserted under the edge of the board, and the board is rolled in place by moving the carrier and board in the direction shown by the arrows in FIG. 5.

I believe that the wallboard will balance on the platform 13 best if the length of the platform is within a certain ratio relative to the length of the shaft 5. The shaft should be approximately twice as long as the length of the platform, providing a ratio of 2:1±20%. By "length" I mean the dimension of platform 13 running from the far left to the far right as seen in FIG. 4.

I claim:

1. A board carrier for carrying of one or more sheets of board, said carrier being integrally molded of plastic and including a platform to receive a sheet of board, said platform having an inner edge and an outer edge, said platform having a lip along said outer edge of said platform, said platform having an upper surface having frictional means on said upper surface to reduce slippage of a sheet of board carried thereon, a pair of shanks having one pair of ends thereof secured to said platform along said inner edge of said platform, said shanks extending upwardly from said platform, said shanks having shank edges facing said platform, said shanks, said platform, and said lip defining a board carrying area, and a horizontal handle running between said shanks proximate to the opposite ends of said shanks from said platform, a recess in each said shank edge proximate to said platform, said shank edge curving into said platform within said recess, whereby one or more sheets of board can be placed on said platform and be carried manually by a person holding said handle in one hand and balancing the board with the other.

2. A wallboard carrier as set forth in claim 1 in which the ratio of the length of said shank to the length of said platform is about 2:1, whereby wallboard will more readily balance on said platform.

3. A board carrier, said board carrier being integrally molded of plastic and including, at least one shank, a handle proximate to one end of said shank and transverse to said shank, and a platform at the other end of said shank, said platform having an upper surface, being transverse to said shank, and extending outwardly from said shank on one side thereof, said shank having a shank edge on the side of said shank facing said platform, a lip on said platform on the side thereof away from said shank, a recess in each said shank edge proximate to said platform, said shank edge curving into said platform within said recess, whereby a piece of wallboard can be placed on said upper surface of said platform and can be lifted by manually lifting said handle.

said upper surface of said platform including means to prevent slippage of wallboard carried thereon, said means to prevent slippage being a series of parallel ribs running transversely from said lip across said upper surface, whereby a board will not slide longitudinally on said platform when being carried.

4. A board carrier, said carrier being integrally molded of plastic and including at least one shank, a handle at one end of said shank, said handle being transverse to said shank, a platform at the other end of said shank from said handle, said platform being transverse to said shank and extending outwardly from said shank on one side thereof, said platform having an upper surface and an undersurface, and a lip on said platform on the side thereof away from said shank, said lip being curved about a horizontal axis, running longitudinally of said platform, and extending to said undersurface of said platform, said lip providing a curved bearing surface for lifting a sheet of board, said upper surface of said platform including means to prevent slippage of board carried thereon, whereby a piece of board can be placed on said upper surface of said platform and can be lifted by manually lifting said handle, and a recess in each said shank edge proximate to said platform, said shank edge curving into said platform within said recess.

* * * * *